United States Patent [19]

Schneider

[11] Patent Number: 5,005,354
[45] Date of Patent: Apr. 9, 1991

[54] FUEL CONTROL HAVING RESET OF PROPELLER OVERSPEED AND UNDERSPEED GOVERNORS

[75] Inventor: Roy W. Schneider, Ellington, Conn.

[73] Assignee: United Technologies Corporation, Hartford, Conn.

[21] Appl. No.: 336,274

[22] Filed: Apr. 11, 1989

[51] Int. Cl.$^5$ .............................................. F02C 9/28
[52] U.S. Cl. ................................. 60/39.281; 416/27
[58] Field of Search ............... 60/39.281; 416/25, 27, 416/28, 30

[56] References Cited

U.S. PATENT DOCUMENTS

| | | | |
|---|---|---|---|
| 2,759,549 | 8/1956 | Best | 60/39.281 |
| 2,861,637 | 11/1958 | Best | 416/28 |
| 2,935,136 | 5/1960 | Wall et al. | 416/27 |
| 2,941,601 | 6/1960 | Best | 416/28 |
| 3,097,700 | 7/1963 | Szydlowski | 416/28 |
| 3,155,165 | 11/1964 | Boyer et al. | 416/29 |
| 3,180,425 | 4/1965 | Blackaby | 416/30 |
| 3,261,405 | 7/1966 | Andrews | 416/27 |
| 4,018,045 | 4/1977 | Greune et al. | 416/27 |

Primary Examiner—Louis J. Casaregola
Attorney, Agent, or Firm—Ronald Snider

[57] ABSTRACT

A flight-mode propeller overspeed governor and underspeed governor is shown and described. The description includes a reset of the overspeed governor during engine acceleration and a reset of the underspeed governor during engine deceleration to eliminate sluggish transient response in the engine.

11 Claims, 3 Drawing Sheets

FUEL CONTROL HAVING RESET OF PROPELLER OVERSPEED AND UNDERSPEED GOVERNORS

TECHNICAL FIELD

This invention relates to control logic for control of airplane propeller overspeed and propeller underspeed while in flight. The invention is to be used with turboprop engines.

BACKGROUND ART

During flight operations, engine fuel is used to control or govern engine power and propeller pitch is used to control or govern propeller speed. In systems currently in use, it is common to utilize a propeller underspeed governor to increase and a propeller overspeed governor to decrease engine power so that engine delivered power is matched to the propeller absorbed power.

FIG. 1 shows a typical prior art overspeed governor and underspeed governor. As can be seen from FIG. 1, propeller speed NP is sensed, compensated and then subtracted from a propeller overspeed reference (NPOSRF). The summing junction output is multiplied by a gain (KOSG) then sent to the fuel control logic. FIG. 1 also shows the same control scheme but configured for the underspeed governor.

In control systems such as those depicted in FIG. 1, a commanded increase in power lever angle (PLA) requires that the engine power be scheduled to a higher power. Increasing engine power however will cause propeller speed to increase, requiring the propeller speed governor to increase pitch in response to this overspeed. The problem with this prior art overspeed governor is that the propeller governor speed error needed for maximum increase pitch rate is at a propeller speed near to the propeller speed reference in the fuel control overspeed governor, so that the fuel control overspeed governor prevents a rapid increase in engine gas generator speed and power. Therefore, the combination of propeller pitch governing propeller speed and engine fuel providing propeller overspeed governing will often result in sluggish engine gas generator acceleration. Similarly, the underspeed governor depicted in FIG. 1, which is the combination of propeller pitch governing propeller speed and engine fuel providing propeller underspeed governing, often will result in sluggish engine gas generator deceleration.

DISCLOSURE OF THE INVENTION

This invention is an apparatus and method for eliminating the problems of sluggish engine acceleration and deceleration described above. Sluggish engine acceleration is eliminated by resetting the propeller overspeed governor in the fuel control whenever engine gas generator speed rate indicates a significant engine acceleration is occurring. Similarly, the fuel control underspeed governor is reset during engine deceleration. These governor resets reduce the interaction between the propeller pitch governor and the overspeed/underspeed engine fuel governors.

The resets increase the overspeed fuel governor reference speed, decrease the underspeed fuel governor reference speed, and/or increase the fuel governor gain in both the overspeed and underspeed governors. The overspeed governor is reset when the engine gas generator speed (NG) exceeds a significant acceleration (3% per second is typical). The underspeed governor is reset when the engine gas generator speed measurement indicates that there is a significant engine deceleration ($-3\%$ per second is typical).

The foregoing and other objects, features and advantages of the present invention will become more apparent in the light of the foregoing description of the preferred embodiments thereof as illustrated in the accompanying drawings.

BEST MODE FOR CARRYING OUT THE INVENTION

Figure 1:
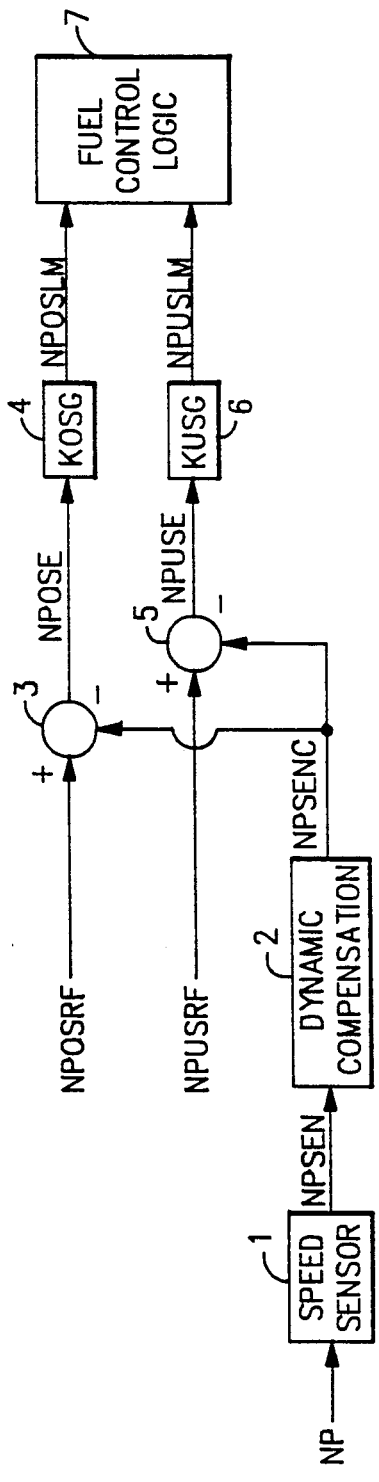
FIG. 1 shows typical overspeed and underspeed governors which are used on propeller driven aircraft.

FIG. 1 shows the prior art method of determining the overspeed and underspeed governor signals (NPOSLM and NPUSLM) to the fuel control. The speed governing references NPOSRF and NPUSRF are constant values and do not change with operating conditions. The input propeller speed NP is sensed at the speed sensor block 1 yielding sensed propeller speed NPSEN. NPSEN is the input to dynamic compensation block 2 yielding compensated sensed propeller speed NPSENC. The dynamic compensation in block 2 is typically lead compensation. NPSENC is subtracted from the overspeed governor reference speed NPOSRF at summing junction 3. The summing junction output is overspeed governor speed error NPOSE which is multiplied by a governor gain KOSG at block 4 to yield a control limit signal NPOSLM. The signal NPOLSM is one of several fuel control signals defining an engine acceleration limit (i.e. an increasing) rate of change in engine power. Referring back to compensated sensed propeller speed NPSENC, NPSENC is subtracted from the underspeed governor reference speed NPUSRF at summing junction 5. The summing junction output is underspeed governor speed error NPUSE which is multiplied by a governor gain KUSG at block 6 to yield a control signal NPUSLM. The signal NPUSLM is one of several fuel control signals defining an engine deceleration limit (i.e. a decreasing rate of change in engine power). The acceleration limit signal NPOSLM and the deceleration limit signal NPUSLM are sent to the fuel control logic block 7.

Figure 2:
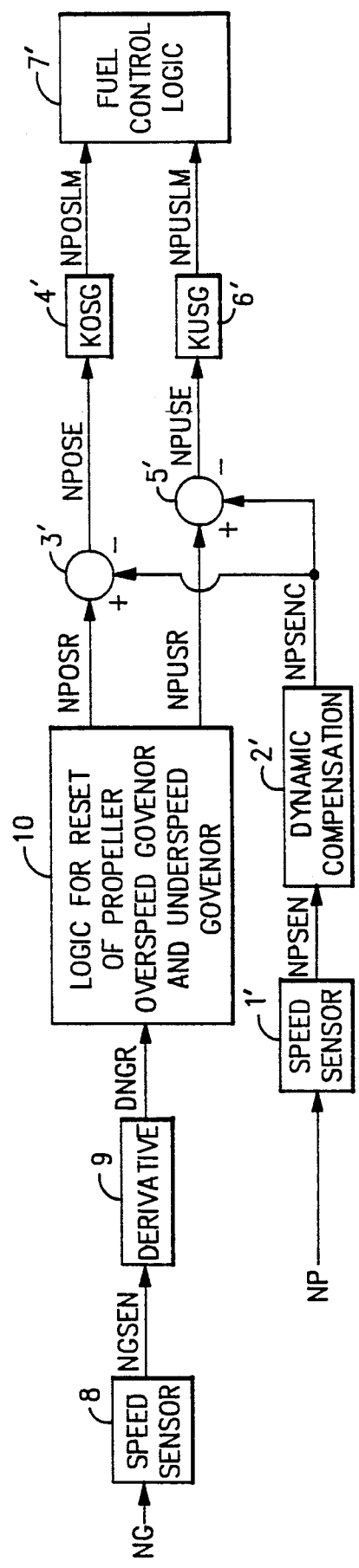
FIG. 2 shows a block diagram for overspeed governing and underspeed governing with speed reset in accordance with this invention.

Referring now to FIG. 2, there is shown an overall block diagram for overspeed governing and underspeed governing in accordance with this invention. The speed sensor block 1', sensed speed dynamic compensation block 2', summing junctions 3' and 5', governor gains blocks 4' and 6', and fuel control logic block 7' are identical to 1, 2, 3, 5, 4, 6, and 7 in FIG. 1. The constant value reference speeds NPOSRF and NPUSRF in FIG. 1 have been replaced by varying value reference speeds NPOSR and NPUSR in FIG. 2. Referring to FIG. 2, engine gas generator speed NG is sensed at the speed sensor block 8 yielding sensed gas generator speed NGSEN. The derivative of gas generator sensed speed is computed at block 9, yield the rate of change of gas generator speed DNGR which is also NG acceleration. DNGR is the input to the logic for reset of the propeller overspeed governor and underspeed governor block 10. The output from block 10 is the overspeed governor reference speed NPOSR and underspeed governor reference speed NPUSR. A detailed description of the logic in block 10 is provided in FIG. 3.

Figure 3:
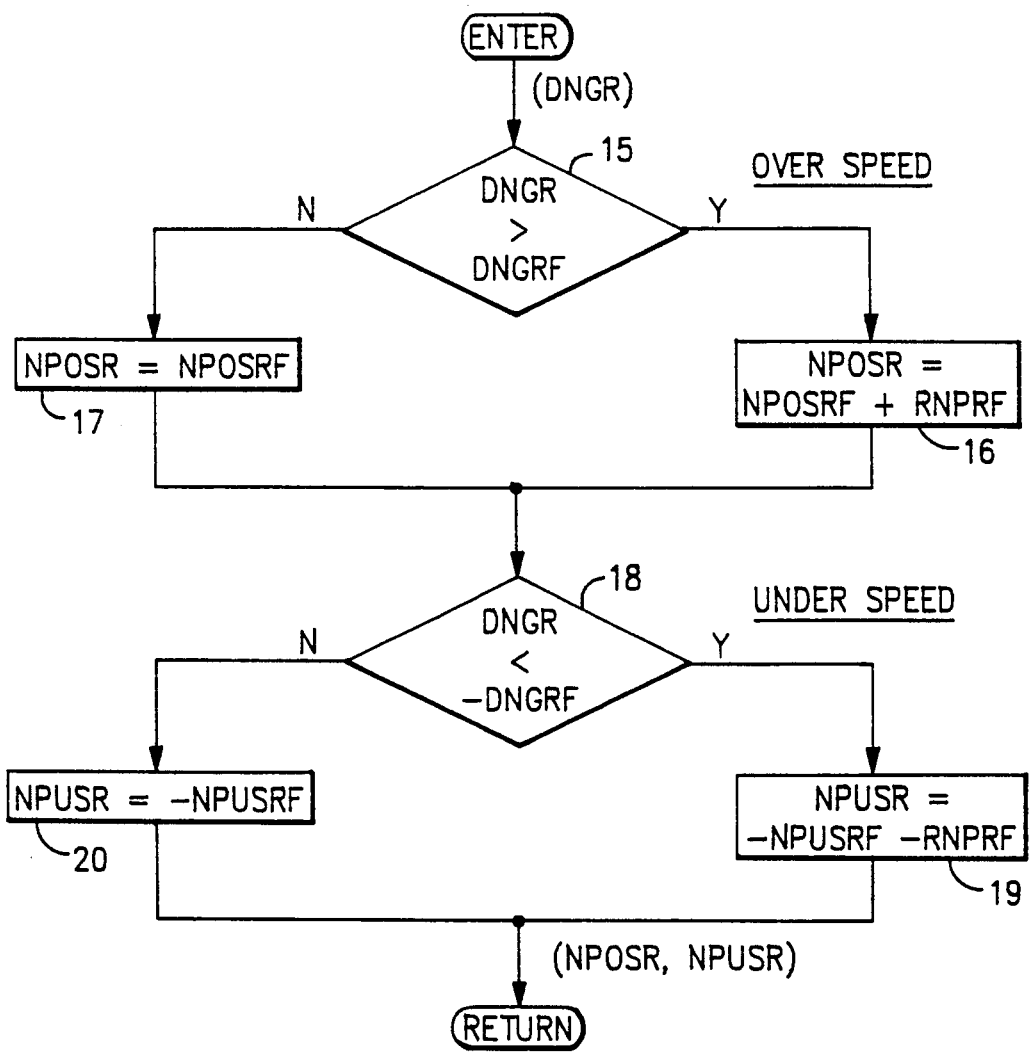
FIG. 3 is the logic flow diagram for reset of propeller overspeed and underspeed governors in accordance with this invention.

FIG. 3 shows the logic flow diagram of one implementation in accordance with this invention. At block 15, the measured value of DNGR (derivative of the sensed gas generator speed) is compared to a reference value (DNGRF). If the measured rate (DNGR) exceeds the reference rate (DNGRF), then at block 16 the speed reference for the overspeed governor NPOSR is set equal to the overspeed governor reference value (NPOSRF) plus a defined amount for resetting the overspeed governor (RNPRF). If at block 15 the gas generator rate (DNGR) is not greater than the reference value, DNGRF, then the overspeed governor speed reference NPOSR is set equal to the propeller overspeed reference NPOSR. The overspeed governor speed reference (NPOSRF) is set equal to the propeller overspeed reference NPOSRF when the gas generator acceleration is less than the defined rate (DNGRF). When the measured gas generator acceleration exceeds the defined rate, then NPOSR is set equal to NPOSRF plus a reset (RNPRF) at block 16.

At block 18 the gas generator speed rate is compared to a defined rate (-DNGRF). If the gas generator speed rate (DNGR) is less than the defined gas generator deceleration speed rate (-DNGRF), then the propeller speed underspeed reference (NPUSR) is set equal to the sum of the propeller underspeed reference (NPUSRF) and a reset (-RNPRF). See block 19 Similarly, if the gas generator speed rate is not less than the defined rate, then the output NPUSR is set equal to the propeller speed underspeed reference NPUSRF as shown at block 20.

Figure 4:
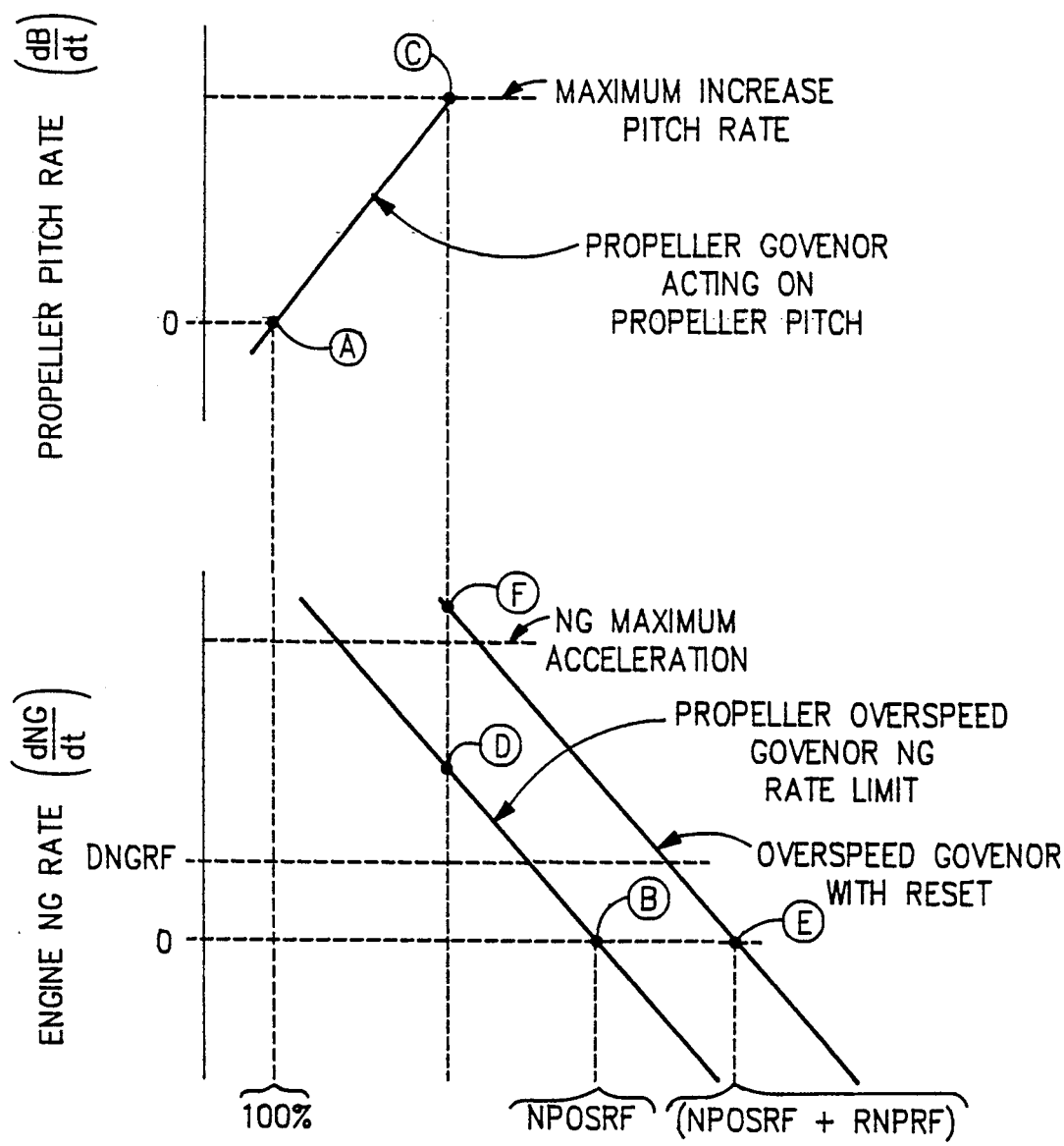
FIG. 4 shows an example of overspeed governing causing sluggish engine acceleration and reset of the overspeed governor eliminating the sluggish acceleration.

FIG. 4 is an example using a pictorial description to show how a propeller overspeed governor limiting engine power will cause sluggish engine acceleration and how reset of the overspeed governor will eliminate sluggish engine acceleration.

In this example, the fuel control configuration is assumed to control gas generator speed NG as the means for controlling engine power. Therefore, the propeller overspeed governor output signal NPOSLM is a limit on gas generator rate.

The in-flight propeller governor acting on pitch and the propeller overspeed governing limiting engine gas generator rate are both plotted versus NPSENC (sensed and compensated propeller speed). Engine NG rate at which speed reset occurs DNGRF and engine NG maximum acceleration (as determined by engine constraints in the fuel control) are overlayed on the plot of propeller overspeed governor engine NG rate limit. The propeller pitch governor is shown to provide zero pitch rate at 100% propeller speed (Point A). The propeller overspeed governor is shown to provide zero engine NG acceleration limit at the overspeed governor reference speed NPOSRF (Point B). The propeller pitch governor commands an increasing propeller pitch rate when propeller speed exceeds 100% and reaches maximum increase pitch rate at Point C. At the propeller speed of Point C, the propeller overspeed governor has an engine NG acceleration limit at Point D. Sine the engine NG acceleration at Point D is less than engine NG maximum acceleration, the engine acceleration will be sluggish. However, the engine acceleration at Point D exceeds engine NG rate reference DNGRF and, in accordance with this invention, the overspeed governor reference speed is reset. The reset reference speed is NPOSRF plus RNPRF shown at Point E. Now the overspeed governor has an NG acceleration limit at Point F when propeller speed is as shown at Point C. The overspeed governor acceleration limit at Point F allows a engine acceleration in excess of the maximum engine acceleration, therefore the sluggish engine acceleration is eliminated.

Although the invention has been shown and described with respect to a best mode embodiment thereof, it should be understood by those skilled in the art that the foregoing and various other changes, omissions and deletions in the form and detail thereof may be made therein without departing from the spirit and scope of this invention.

I claim:

1. Apparatus for controlling a gas generator engine having a propeller associated therewith, comprising:
engine acceleration means, for providing an engine acceleration signal indicative of an increasing or decreasing rate of change of engine speed;
underspeed reset means, for comparing said engine acceleration signal to a reference underspeed signal to determine a presence of an underspeed reset condition, and for providing in response to the presence of said underspeed reset condition an underspeed reset signal indicative of a desired propeller speed and having a desired propeller speed value lower than a desired propeller speed value in the absence of said underspeed reset condition;
overspeed reset means, for comparing said engine acceleration signal to a reference overspeed signal to determine a presence of an overspeed reset condition, and for providing in response to the presence of said overspeed reset condition an overspeed reset signal indicative of a desired propeller speed and having a desired propeller speed value higher than a desired propeller speed value in the absence of said overspeed reset condition.

2. The apparatus of claim 1, further comprising:
propeller speed sensor means, for providing a propeller speed signal indicative of propeller speed;
underspeed error means, for comparing said propeller speed signal with said underspeed reset signal and for providing an underspeed error signal indicative of any difference therebetween; and
overspeed error means, for comparing said propeller speed signal with said overspeed reset signal and for providing an overspeed error signal indicative of any difference therebetween.

3. The apparatus of claim 1, wherein said underspeed reset means comprises means for providing said underspeed reset signal in the presence of said underspeed reset condition when said engine acceleration signal is determined to be indicative of a deceleration rate of the engine of at least three percent per second.

4. The apparatus of claim 1, wherein said overspeed reset means comprises means for providing said overspeed reset signal in the presence of said overspeed reset condition when said engine acceleration signal is determined to be indicative of an acceleration rate of the engine of at least three percent per second.

5. Apparatus for controlling a gas generator engine having a propeller associated therewith, comprising:
  engine acceleration means, for providing an engine acceleration signal indicative of an increasing or decreasing rate of change of engine speed;
  reset means, for comparing said engine acceleration signal to a reference speed signal to determine a presence of a speed reset condition, and for providing in response to the presence of said speed reset condition a speed reset signal indicative of a desired propeller speed and having a desired propeller speed value which differs from a desired propeller speed value in the absence of said speed reset condition.

6. The apparatus of claim 5, wherein said reset means further comprises means for comparing said engine acceleration signal to said reference speed signal to determine an underspeed reset condition, and for providing in response to the presence of said underspeed reset condition said speed reset signal indicative of a desired propeller speed and having a desired propeller speed value lower than a desired propeller speed value in the absence of said underspeed reset condition.

7. The apparatus of claim 6, further comprising:
  propeller speed sensor means, for providing a propeller speed signal indicative of propeller speed; and
  underspeed error means, for comparing said propeller speed signal with said speed reset signal and for providing an underspeed error signal indicative of any difference therebetween.

8. The apparatus of claim 7, wherein said reset means further comprises means for providing said speed reset signal in the presence of said underspeed reset condition when said engine acceleration signal is determined to be indicative of a deceleration rate of the engine of at least three percent per second.

9. The apparatus of claim 5, wherein said reset means further comprises means for comparing said engine acceleration signal to said reference speed signal to determine an overspeed reset condition, and for providing in response to the presence of said overspeed reset condition said speed reset signal indicative of a desired propeller speed and having a desired propeller speed value higher than a desired propeller speed value in the absence of said overspeed reset condition.

10. The apparatus of claim 9, further comprising:
  propeller speed sensor means, for providing a propeller speed signal indicative of propeller speed; and
  overspeed error means, for comparing said propeller speed signal with said speed reset signal and for providing an overspeed error signal indicative of any difference therebetween.

11. The apparatus of claim 10, wherein said reset means further comprises means for providing said speed reset signal in the presence of said overspeed reset condition when said engine acceleration signal is determined to be indicative of an acceleration rate of the engine of at least three percent per second.

* * * * *